United States Patent [19]
Flammer, III et al.

[11] Patent Number: 5,471,469
[45] Date of Patent: Nov. 28, 1995

[54] METHOD OF RESOLVING MEDIA CONTENTION IN RADIO COMMUNICATION LINKS

[75] Inventors: George H. Flammer, III, Cupertino; Brett D. Galloway, Campbell, both of Calif.

[73] Assignee: Metricon, Inc., Los Gatos, Calif.

[21] Appl. No.: 193,338

[22] Filed: Feb. 8, 1994

[51] Int. Cl.⁶ .......................... H04B 1/713; H04J 13/06
[52] U.S. Cl. .................. 370/94.1; 370/95.2; 370/95.3; 375/202
[58] Field of Search .................. 370/50, 85.2, 85.3, 370/85.8, 94.1, 94.2, 95.2, 18; 375/1, 58, 202, 285; 455/166.1, 63; 380/33, 34

[56] References Cited

U.S. PATENT DOCUMENTS

| | | | |
|---|---|---|---|
| 4,554,668 | 9/1995 | Deman et al. | 375/1 |
| 4,850,036 | 7/1989 | Smith | 375/1 |
| 5,079,768 | 1/1992 | Flammer | 370/94.1 |
| 5,130,987 | 7/1992 | Flammer | 370/94.2 |

Primary Examiner—Hassan Kizou
Attorney, Agent, or Firm—Townsend and Townsend and Crew; Stephen J. LeBlanc; Kenneth R. Allen

[57] ABSTRACT

In a wireless packet communication system having a plurality of nodes, each having a transmitter and a receiver, the receiver at each node is assigned a specific frequency hopping band plan on which to receive signals, and the transmitter of any source node desiring to communicate with a target node changes frequency to the frequency of the target node according to the band plan. Thereupon, the source node transmits a poll packet which polls the target node to determine whether the target node is able and willing to accept a specified number of packets, at a specified level of priority. A failure to receive an acknowledgement on the source node's receive channel is a prompt to the source node either to retransmit a polling packet later, to change the polling packet or to redirect the polling packet to another target. In the event the target node returns an acknowledgement, the target node reserves access to itself for the polling station at a determined time for a determined duration. The source node then transmits its data packet on the target node receive channel and waits for an acknowledgement on its own receive channel. The source node and the target node exchange information on the agreed upon data exchange channel, even though the expected receive channel according to the frequency hopping band play of the target node may have changed in the meantime.

16 Claims, 4 Drawing Sheets

METHOD OF RESOLVING MEDIA CONTENTION IN RADIO COMMUNICATION LINKS

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

MICROFICHE APPENDIX

This application has been filed with a microfiche appendix of 17 frames in length containing source code listings of elements of one embodiment of the present invention.

BACKGROUND OF THE INVENTION

The invention relates generally to a method for communication of digital data packets. More particularly, this invention relates to a technique for minimizing contention due to simultaneous transmissions via radio communication links between nodes in a packet communication network.

Packet communication networks provide for the transfer of data packets between various remote locations herein referred to as nodes. Nodes are equipped with transmitters and receivers that can transmit data over a medium, which may be radio waves, fiber optic cable, wire, etc. In a shared-medium network, more than one node is connected to the same medium, introducing the possibility of contention if more than one transmitter attempts to transmit on the medium at the same time. When there is contention, data packets clash, resulting in loss of data.

In order to avoid contention and for successful data transfer, each node must operate in accordance with a protocol determining when it may transfer on the medium, for how long, and, in a multiple frequency network, at what frequency. Additional protocol tasks include error checking and error correction.

In a polled network, the protocol is implemented by having a transmitter that wishes to transmit a data packet first send a short poll packet to the receiver asking if the receiver is available to receive the data packet. If the transmitter receives an acknowledgement back from the intended receiver, the data packet is then sent. In a type of network protocol known as a time-slotted network protocol, there is a designated window of time, known to all nodes, when poll packets may be transmitted. When a poll packet is successfully transmitted and acknowledged during this designated period of time, data may then be transmitted during a subsequent window of time, a data window. While this procedure effectively ensures that the receiver will be free to receive the data being sent, it does not necessarily prevent other transmitters on the network from transmitting on the medium during the data packet transmission and thereby causing contention.

Several specific protocols have been employed for resolving this latter type of contention. Among them is the Carrier Sense Multiple Access/Collision Detect or CSMA/CD protocol, wherein the transmitter in each node is responsible for detecting and avoiding data packet collisions. Transmitters listen to the medium before transmitting (the Carrier Sense) and then listen while transmitting to see if a collision has occurred (the Collision Detect). This protocol is most useful where it is practical to detect collisions while a packet is being transmitted. It is less useful in communications systems where the medium is radio waves because it is expensive to implement a transmitter that can listen for collisions while transmitting.

Other protocols that are more useful for radio links are the Aloha protocol and the slotted Aloha protocol. In these protocols, the transmitter nodes respond to the failure to receive an acknowledgement of reception transmitted by the destination node. In the Aloha protocol, the transmitter nodes know merely to try again later in the event of a failure to receive an acknowledgement, while in the slotted Aloha protocol, the transmitter nodes are commanded by the destination node to transmit on a schedule determined by the destination node.

The disadvantage of these protocols is primarily that they become more complex as the number of potential transmitter nodes on the medium increases and a large amount of the available time on the medium becomes diverted away from sending data and is instead involved in transmitting poll information. This reduces the overall data throughput of the network. The protocols are particularly inefficient when applied to a peer-to-peer network where there is no network controller that can determine when a channel has been reserved by a particular transmitter and prevent other transmitters from transmitting during that time and causing contention.

U.S. Pat. No. 5,079,768, issued to one of the inventors of the present invention, describes a peer-to-peer frequency-hopping communication network in which every receiver node is assigned a different starting point or home slot in a frequency hopping pattern. The frequency-hopping pattern is a randomized ordered list of all the channels available to nodes in the network. The channel order is shared by all the nodes in the network, but contention is reduced by having each node start its channel hopping at a different channel in the list. Transmitters wishing to transmit to a receiver node switch to that receiver's current frequency in the hopping pattern to transmit a poll packet. The transmitter first listens at the assigned frequency of the receiver to determine if there is any traffic on that frequency. If there is traffic at that frequency, the transmitter waits an interval and the transmitter and receiver both hop to the next frequency in the pattern and the transmitter listens again. Once a frequency is found with no traffic, the transmitter sends a poll packet, and when that poll packet is acknowledged, sends a data packet before the hop to the next frequency. In a particular embodiment of this network, frequency hopping occurs once every second. It has been found that there can be a relatively large amount of wasted potential data transmission time with this design while transmitters and receivers look for an empty frequency. Effective throughput is limited to a fraction of potential throughput.

What is needed is a low-cost, reliable mechanism for reserving only the network resources required for the time period required, and which is simple to implement and yet has very low overhead.

SUMMARY OF THE INVENTION

According to the invention, in a wireless LAN packet communication system having a plurality of nodes, each having a transmitter and a receiver, the receiver at each node is assigned a specific frequency hopping band plan on which to receive signals. The frequency of the receive channel "hops" from one frequency to the next according to the band plan at specified intervals and the channel hopping band plan of each receiver node is known to all nodes in the network. The transmitter of any source node desiring to communicate with a target node changes its frequency to follow the band plan of the receiver of the target node. Thereupon, the source node transmits a poll packet that polls the target node to determine whether the target node is able and willing to accept a specified number of data packets at a specified level of priority. A failure to receive an acknowledgement on the source node's receive channel is a prompt to the source node either to retransmit a polling packet later or to redirect the polling packet to another target. In the event the target node returns an acknowledgement, the target node reserves access to itself for the polling station at a preselected time for a preselected duration on a specified frequency channel that is different from the assigned channel according the band plan for the target node. The source node then transmits its data packet on the target node's data receive channel and waits for an acknowledgement on its own receive channel. The source node and the target node exchange information on the same channel throughout the interchange, even though the assigned receive channel of the target node may have changed in the meantime.

While data is being received by the target node, it is simply unavailable at its assigned frequency. Other nodes that attempt to send it a polling packet at its assigned frequency will not get an acknowledgement and will either wait or send the packet to a different target. An advantage of the invention is that these polling packets will not clash with data being received by the target node, because that data is being received on a different frequency. When the data transfer is complete, the receive node switches back to its assigned channel according to its frequency hopping band plan and is ready to receive a polling packet for any transmitter that is looking for it at its assigned channel.

This protocol is simple to implement, as only the two communicating nodes are affected. Reservation of access is for exactly the correct duration at exactly the right time, and a data packet can never contend with a competing polling packet from another transmitter.

The invention will be better understood upon reference to the following detailed description in connection with the accompanying drawings.

DESCRIPTION OF SPECIFIC EMBODIMENTS

Figure 1:
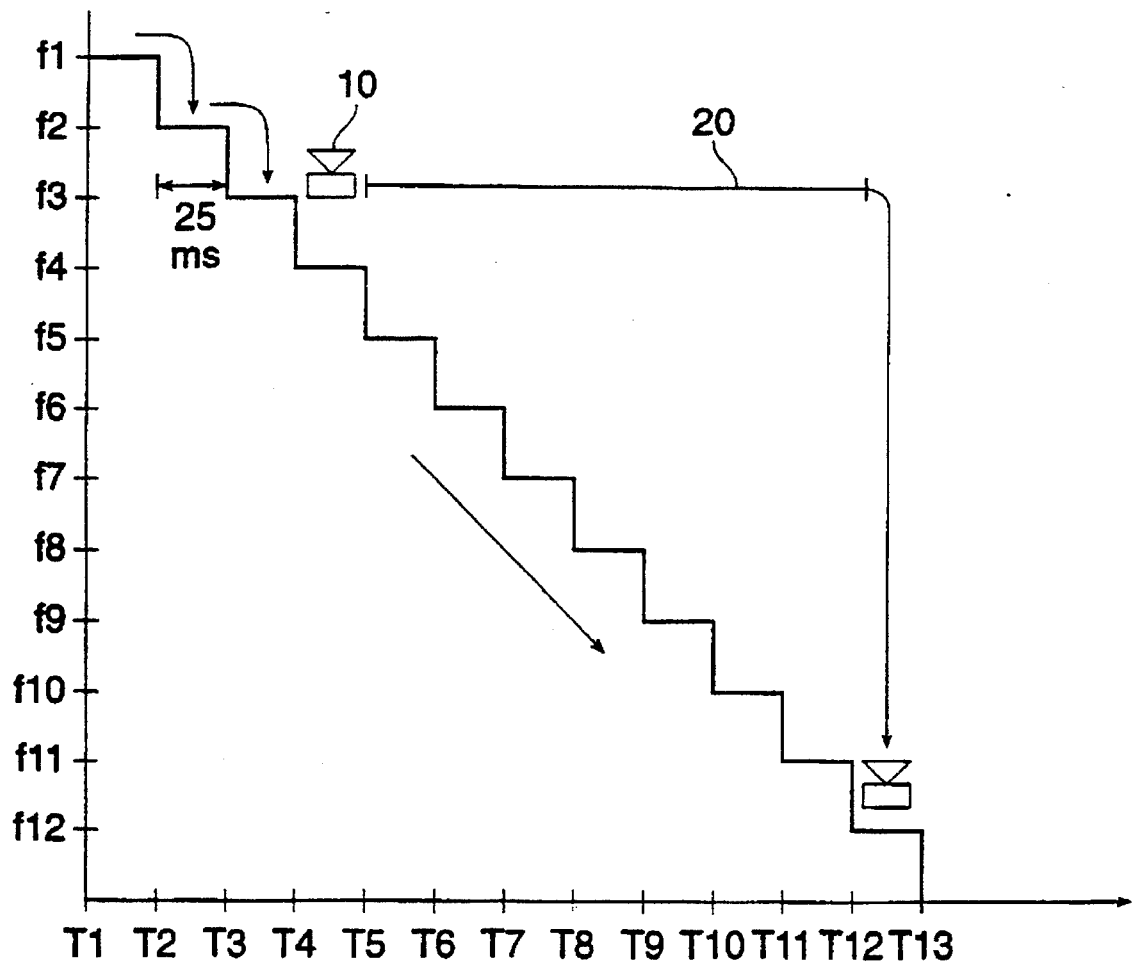
FIG. 1 is timing diagram showing the frequency hopping and data reservation functions of a target node according to the invention.

FIG. 1 depicts the operation of a frequency hopping receiver node according to the invention. At time T1, the receiver is set to receive packets at an assigned frequency F1. The receiver stays at that frequency until time T2, at which time it hops according to its frequency hopping band plan to receive packets at a new assigned frequency F2. All the transmitting nodes in the network know the assigned frequency of the receiving nodes at any given time. During a time period beginning at time T3, the receiving node, indicated by icon 10, hops to frequency F3 and receives a polling packet from a transmitter. This polling packet asks if the receiver is available to receive a packet of data of a certain length and at a certain priority. If the receiver is available for receiving such a packet, it sends an acknowledgement to that effect back to the transmitter and then remains at frequency F3 and the data packet is transmitted during a data transmission window 20. In this example, data packet transmission is completed at time T12, at which time the receiver hops to the frequency which it should be at according to its frequency hopping band plan and is available to receive packets at frequency F12.

During the time from T4 to T12, the receiver is not available at its frequency hopping band plan assigned frequencies F4 to F12. Any other transmitter that sends a polling packet requesting availability of the receiver will do so on frequencies F4–F12 and will not receive a response and will therefore know that the receiver is unavailable. These polling packets will not cause contention with the data being received by the receiver, because the receiver has remained at frequency F3 to receive data packets. As soon as the data transmission is complete, the receiver switches to its assigned frequency according to its frequency hopping band plan and is ready to again receive a polling packet. In this way, the receiver's available time is taken up just so long as is necessary to transmit the data, and contention between data packets and polling packets are avoided.

Figure 2:
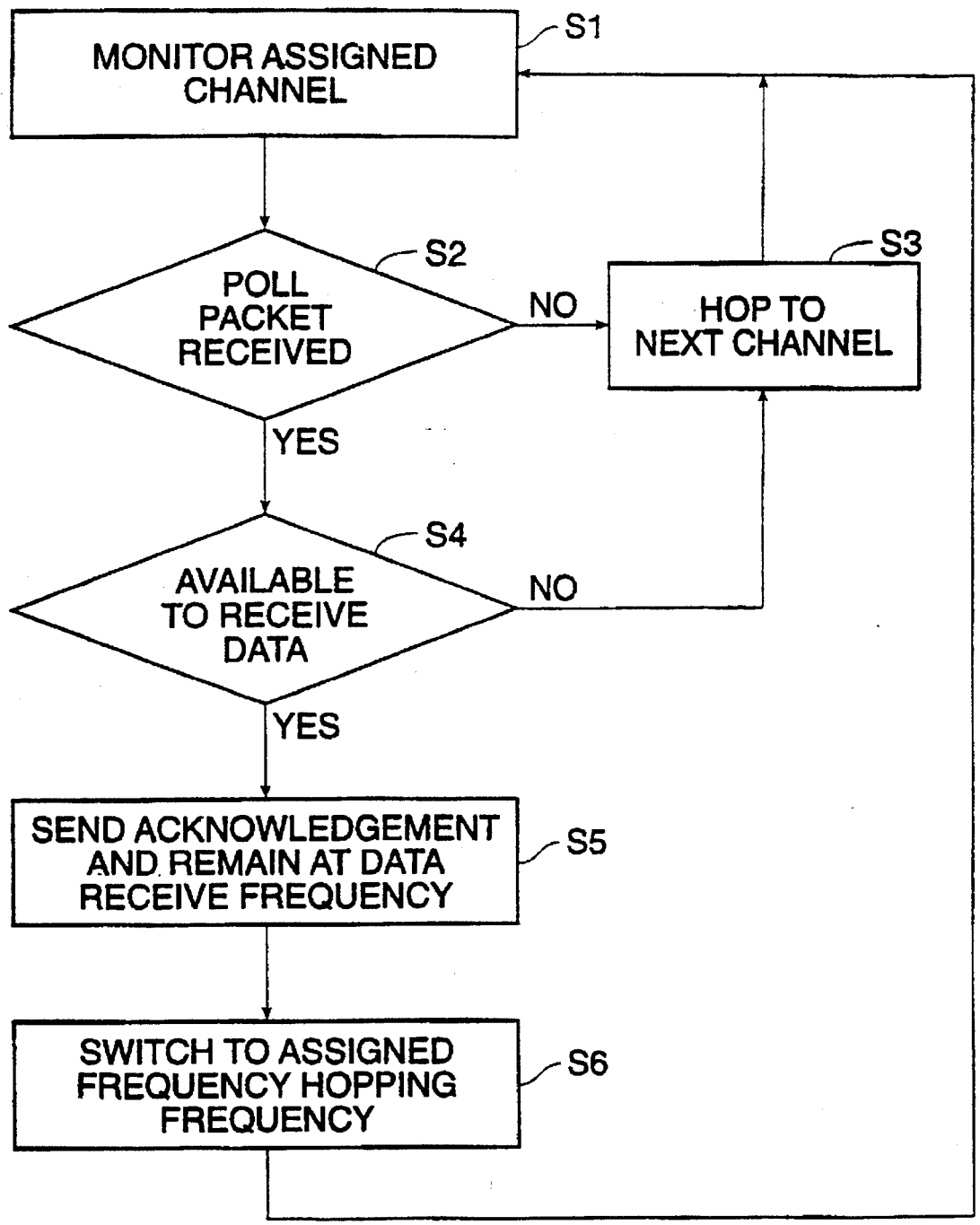
FIG. 2 is a flowchart illustrating the operation of the target node controller according to the invention.

FIG. 2 is a flowchart illustrating the operation of a receiving node. The receiver monitors its assigned channel (Step S1). If no polling packet is received on this channel (Step S2), the receiver hops at a specified time to its next assigned channel (Step S3). If a polling packet is received on the assigned channel, the receiver determines if it is available to receive the requested packet (Step S4). If the receiver is ready to receive the packet, it sends an acknowledgement packet to the transmitter and remains at the data frequency until the packet is successfully received (Step S5). Once the packet is successfully received, the receiver goes back to its assigned frequency (Step S6) and continues monitoring for polling packets (Step S1).

Figure 3:
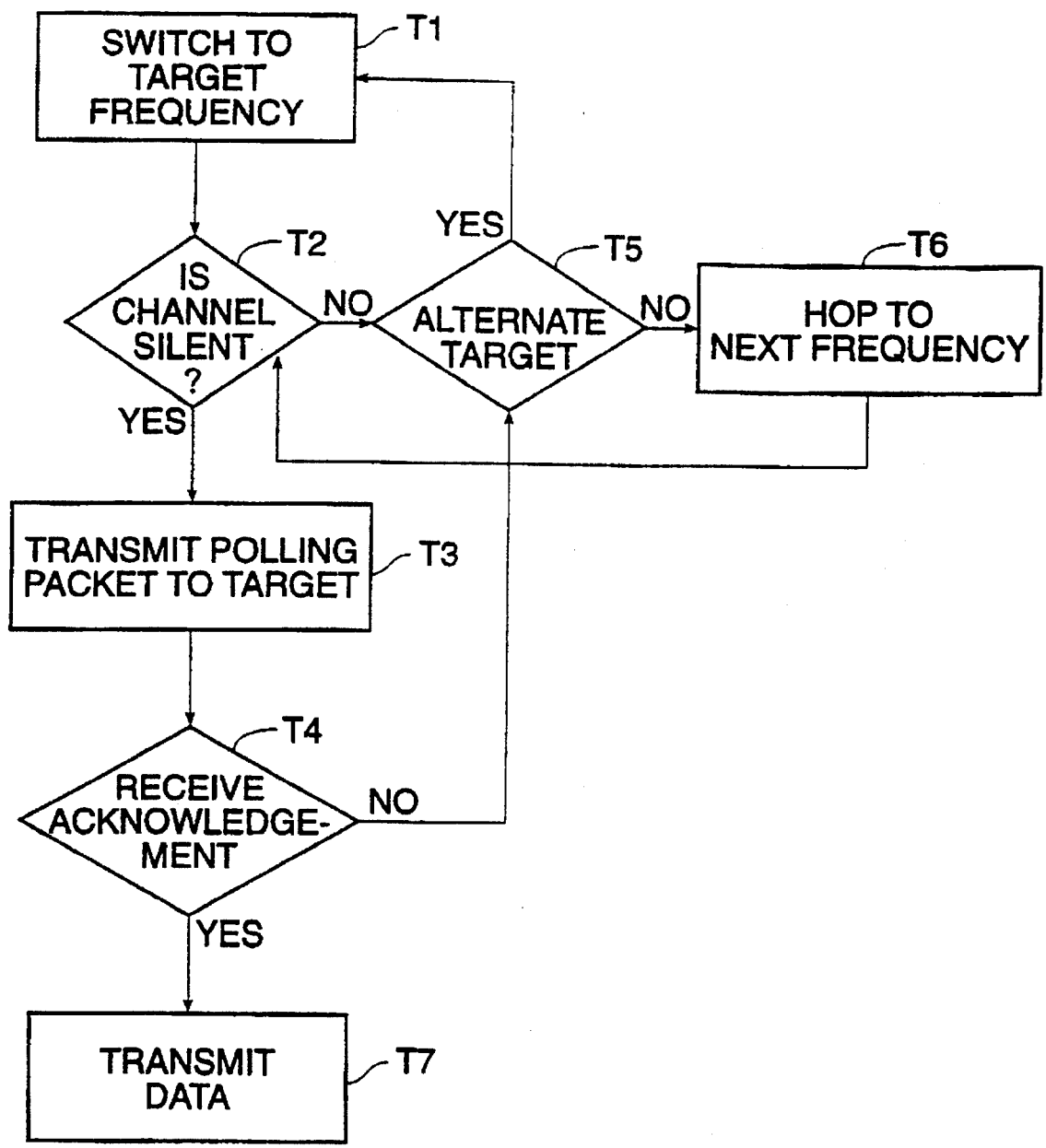
FIG. 3 is a flowchart illustrating the operation of the source node controller according to the invention.

FIG. 3 is a flowchart illustrating the operation of a transmitting node. The transmitter first switches to the assigned frequency of the receiver to which it wishes to transmit (Step T1). It then listens at that frequency channel to determine if the frequency is silent (Step T2). If the channel is silent, the transmitter transmits a polling packet to the receiver (Step T3). The transmitter then listens to see if an acknowledgement is received (Step T4). If no acknowledgement is received or if the channel was not silent, the transmitter determines if there is another node to which it may transmit the packet that will get the packet to its ultimate destination (Step T5). If there is no other node available to move the packet closer to its ultimate destination, the transmitter waits (Step T6) and then retransmits a polling packet to the same receiver at its new assigned frequency (Step T5). If an acknowledgement is received, the transmitter transmits the data packets (Step T7).

Figure 4:
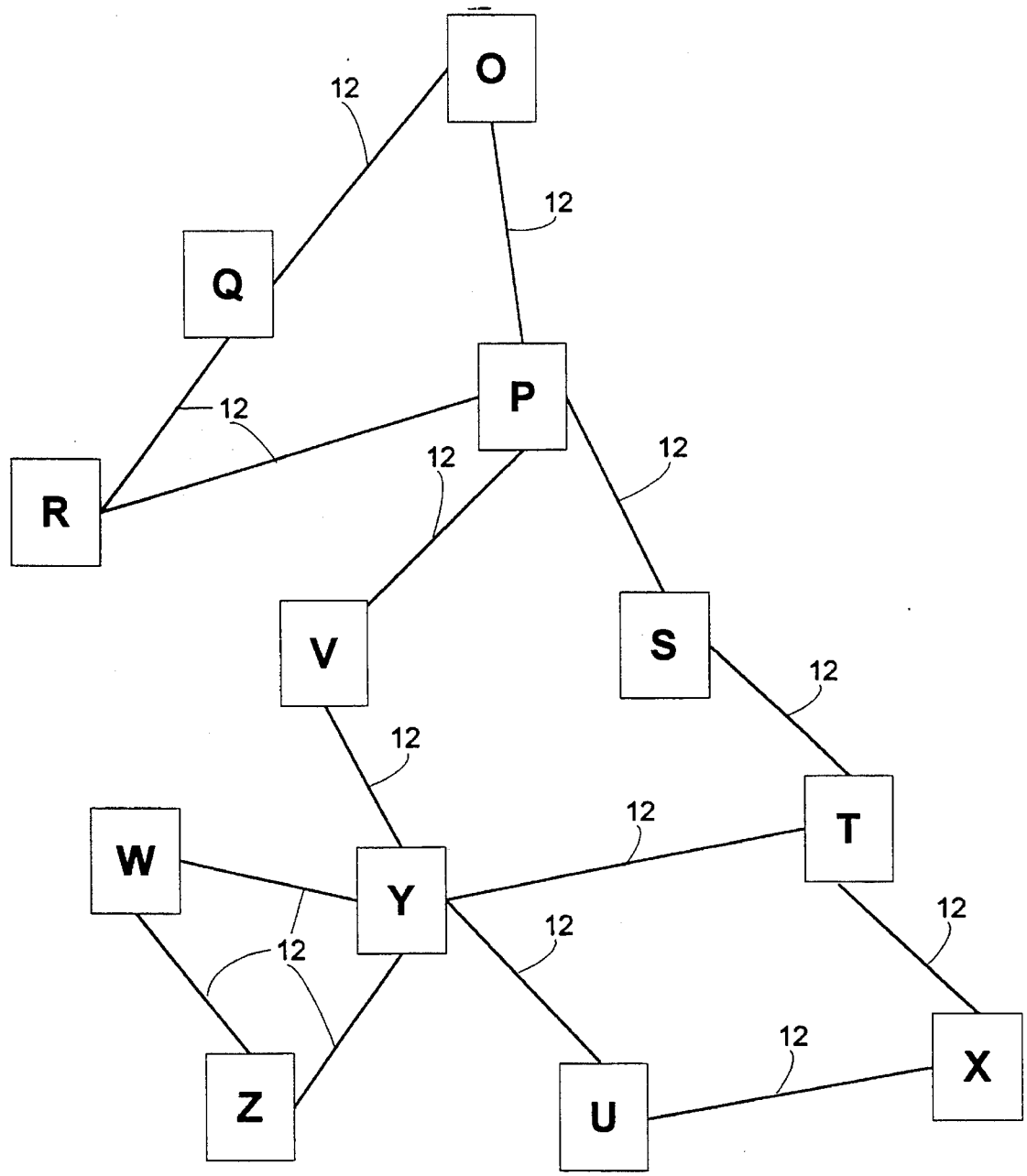
FIG. 4 is a diagram of a communications network according to the invention.

FIG. 4 is a diagram of a communications network according to the invention. FIG. 4 shows a plurality of nodes 0 through Z. These nodes share a communications medium through which nodes can communicate with one another. Lines 12 indicate communications between nodes. The nodes 0 through Z many have any of the functionality described elsewhere in the specification for communication nodes. As previously discussed, the shared medium may be radio waves, fiber optic cable, wire, etc.

In a specific embodiment of the protocol of the invention, the receiver and transmitter may not transmit on any one frequency channel for more than 400 ms so as to comply with regulations of the United States Federal Communication Commission. If the data transmission is of longer duration than this, the transmitter and receiver will switch to another frequency channel which is not the current assigned frequency channel, such as the numerically next frequency channel, and remain there until the data is transmitted.

In an alternative embodiment of the invention, the receiver and the transmitter do not remain at the assigned frequency after a poll packet is acknowledged in order to send a data packet, but instead move to another frequency for data packet transmission. However, remaining at the assigned frequency on which the polling packet was received and acknowledged has the advantage that it is established that the transmitter and receiver can communicate on that channel.

The invention has now been explained with reference to specific embodiments. Other embodiments will be apparent to those of ordinary skill in the art. It is therefore not intended that this invention be limited except as indicated by the appended claims.

What is claimed is:

1. In a communications network having a plurality of nodes each capable of transmitting and or receiving data over any one of a plurality of shared channels, a method for enabling any transmitting node to transmit data to any receiving node without contention from any other transmitting node comprising the steps of:

assigning to each receiving node a channel hopping band plan that is known to any node in the network wishing to transmit data to said receiving node and enabling said receiving node to follow said channel hopping band plan;

monitoring for silence at a transmitting node an expected channel of a receiving node according to said receiving node's channel hopping band plan in order to determine if said receiving node is idle;

transmitting from a transmitting node a polling packet to a receiving node at an expected channel according to said receiving node's channel hopping band plan;

receiving at said transmitting node from said receiving node an acknowledgement packet if said receiving node is available to receive data packets; and, transmitting data from said transmitting node to said receiving node on a channel which is different from the expected channel for said receiving node according to said receiving node's channel hopping band plan.

2. The method according to claim 1 wherein said channel which is different from the expected channel for said receiving node is the channel at which the acknowledged polling packet was transmitted.

3. The method according to claim 1 wherein failure to receive an acknowledgement packet at said transmitting node from said receiving node causes said transmitting node to either wait a determined amount of time before transmitting a new polling packet to said receiving node at said receiving node's then expected channel or to select an alternative receiving node and transmit a polling packet on said alternative receiving node's expected channel.

4. The method according to claim 1 further comprising the step of switching said receiving node back to its expected channel according to its channel hopping band plan once data transmission is complete.

5. A communications network comprising:

a shared medium with a plurality of channels; and a plurality of channel-agile nodes each capable of transmitting and or receiving on the plurality of channels of said shared medium wherein each of said nodes capable of receiving is assigned and follows a channel hopping band plan that is known to each of the nodes wishing to transmit to said node capable of receiving;

whereby a first node wishing to transmit data to a second node switches to the expected channel of said second node according to said second node's channel hopping band plan and then after detecting silence transmits a polling packet and whereby on receipt and successful acknowledgement of said polling packet said first node transmits data to said second node on a channel which is different from the expected channel of said second node according to said second node's frequency hopping band plan.

6. The method according to claim 1 wherein said plurality of nodes are enabled to transmit and receive data via radio signals and wherein said channels are radio frequency bands.

7. The method according to claim 1 wherein said data is comprised of digital data packets.

8. The method according to claim 1 wherein said communications network is a wireless local area network.

9. The method according to claim 7 wherein said polling packet contains a request for said receiving node to accept a specified number of data packets at a specified priority.

10. The method according to claim 7 wherein said receiving node hops between channels at a specified interval of time.

11. The method according to claim 1 further comprising the step of determining if the total time it will take to complete transmitting data will exceed a certain predetermined allowed time interval and if said transmitting will exceed said allowed time interval, hopping to another channel different from the expected channel for said receiving node in order to continue transmitting data.

12. The communications network according to claim 5 wherein said plurality of channel-agile nodes are enabled to transmit and receive data via radio signals and wherein said channels are radio frequency bands.

13. The communications network according to claim 5 wherein said data is comprised of digital data packets.

14. The communications network according to claim 5 wherein said communications network is a wireless local area network.

15. The communications network according to claim 14 wherein said polling packet contains a request for said receiving node to accept a specified number of data packets at a specified priority.

16. The communications network according to claim 5 wherein said channel-agile nodes hop between channels at a specified interval of time.

* * * * *

UNITED STATES PATENT AND TRADEMARK OFFICE
CERTIFICATE OF CORRECTION

PATENT NO. : 5,471,469

DATED : November 28, 1995

INVENTOR(S) : Flammer III, et al.

It is certified that error appears in the above-identified patent and that said Letters Patent is hereby corrected as shown below:

On the cover page the Assignee's name is misspelled. Please delete "Metricon" and change to --Metricom--.

Signed and Sealed this

Twenty-sixth Day of March, 1996

Attest:

BRUCE LEHMAN

*Attesting Officer*    *Commissioner of Patents and Trademarks*